United States Patent

Palfey et al.

[11] Patent Number: 6,002,337
[45] Date of Patent: Dec. 14, 1999

[54] METHOD AND APPARATUS FOR IMPROVED FLOW CONTROL

[75] Inventors: Paul B. Palfey; Gary J. Gress; Gordon A. Moyle, all of Portland, Oreg.

[73] Assignee: Proflow Inc., Portland, Oreg.

[21] Appl. No.: 09/016,554

[22] Filed: Jan. 30, 1998

[51] Int. Cl.$^6$ .................................................. G08B 21/00
[52] U.S. Cl. ........................ 340/606; 251/129.08; 137/1
[58] Field of Search .................... 340/606, 610; 251/129.15, 129.08; 137/1, 625.4

[56] References Cited

U.S. PATENT DOCUMENTS

| | | | |
|---|---|---|---|
| 4,196,751 | 4/1980 | Fischer et al. | 137/625.65 |
| 4,781,220 | 11/1988 | Smith | 137/625.65 |
| 4,809,742 | 3/1989 | Grau | 137/554 |
| 4,823,825 | 4/1989 | Buchl | 137/1 |
| 4,953,590 | 9/1990 | Kakinuma et al. | 137/554 |
| 5,020,773 | 6/1991 | Tuft et al. | 251/129.12 |
| 5,197,508 | 3/1993 | Gottling et al. | 137/1 |
| 5,207,239 | 5/1993 | Schwitalla | 137/115 |
| 5,442,515 | 8/1995 | Wallaert | 361/187 |
| 5,481,260 | 1/1996 | Buckler et al. | 340/606 |
| 5,494,255 | 2/1996 | Pearson et al. | 251/129.15 |
| 5,509,439 | 4/1996 | Tantazdini | 137/269 |
| 5,526,695 | 6/1996 | Kilayko | 73/861.38 |
| 5,575,309 | 11/1996 | Connell | 137/556 |
| 5,711,342 | 1/1998 | Kazama et al. | 137/486 |
| 5,787,915 | 8/1998 | Byers et al. | 137/1 |

*Primary Examiner*—Jeffery A. Hofsass
*Assistant Examiner*—Anh La
*Attorney, Agent, or Firm*—Birdwell & Janke, LLP

[57] ABSTRACT

A method and apparatus for improved flow control. A flow metering valve has an actuator formed of magnetic material which moves on response to an applied magnetic field to control fluid flow through the valve. A servo-control circuit receives a position command signal representative of a desired position of the actuator and produces an output command to produce a magnetic field in response thereto. The magnetic permeability of the actuator modifies the applied field and a magnetic field sensor measure the modified magnetic field to determine the position of the actuator. An actual position signal representative of the position of the actuator is negatively fed back to the servo-control circuit which produces an updated version of the output command.

16 Claims, 2 Drawing Sheets

METHOD AND APPARATUS FOR IMPROVED FLOW CONTROL

BACKGROUND OF THE INVENTION

This invention relates to a method and apparatus for improved flow control, particularly by providing improved control of a metering valve. More particularly, the invention relates to a method and apparatus for improving the accuracy, repeatability and speed of control in a flow control system.

It is often desired to control the flow of a fluid. An important area of application for flow control is in controlling mass-flow. For example, in semiconductor fabrication it is routinely important to introduce controlled quantities of liquids or gases for depositing precision films, or precise concentrations of dopant materials. Metering valves are provided for this purpose and typically employ an aperture and an actuating rod which translates toward or away from the aperture, the actuating rod having a plunger which blocks the aperture to a variable and controllable degree. The actuating rod, which is typically formed of a ferromagnetic material, is typically spring-biased in one direction, e.g, wherein the valve is either open or closed, and controllably urged in the other direction by a magnetic field. The selected magnetic field is created by passing a corresponding selected electrical input current through a coil which is coaxially disposed around the rod. Thence, the selected electrical input current correlates with a desired linear position of the rod, or mass-flow "setting."

The setting of a typical metering valve is controlled by a control system which receives a set-point value of flow, measures the actual flow and, by providing an appropriate electrical input to the metering valve, instructs the metering valve to move the actuating rod to make the measured flow equal the set-point value. Especially in relatively inexpensive flow metering systems, the control system typically assumes that a given electrical input will produce the correct setting in the metering valve. However, all metering valves have mechanical and electrical tolerance errors that prevent achieving arbitrarily accurate or repeatable settings in response to given electrical inputs. This error typically includes a bias component and a random component, both of which may be expected to vary with the setting. Although it is the task of the control system to correct for this error, the demand placed upon the control system generally increases its response time and decreases its stability.

Goettling et al., U.S. Pat. No. 5,197,508 ("Goettling") proposes a valve apparatus and method for controlling fluid flow that provides a closed-loop control circuit for the fluid valve itself, for eliminating the aforementioned error. Goettling measures the position of a permanent magnet affixed to a valve actuating rod with a field sensor, such as a Hall effect sensor, to produce a feed-back signal transmitted to a proportional solenoid for controlling the position of the rod.

A disadvantage of Goettling, however, is that it requires a separate permanent magnet to be installed on a valve rod, resulting in additional mechanical complexity and cost. Another disadvantage of the use of the permanent magnet of Goettling is that the valve employing it must be specially manufactured. The magnet cannot be added later, and the scheme will not work with a standard valve.

Still another disadvantage with employing the permanent magnet of Goettling is in electronic complexity. The magnetic field of the permanent magnet will bias the field sensor. For example, a Hall effect sensor has a transfer characteristic that proportionally relates input magnetic field and output voltage. A permanent magnet may bias the sensor into a region that is not linear, requiring a complex electronic compensation. And even if it does not, the simple, proportional relationship is lost and some additional complexity is required to un-bias the sensor.

It is sometimes particularly desirable to employ stainless steel, plastic or other materials having relatively great physio-chemical resistance in a metering valve because, often, the fluids passed through these valves are caustic. As it is sometimes not possible to seal the internal workings of the valve completely from these fluids, limitations in the choice of materials, such as any requirement to employ a permanent magnet, may be additionally undesirable.

Accordingly, there is a need for a method and apparatus for improved flow control that provides for responsive, accurate, repeatable and stable control of a fluid flow metering valve at a minimum cost.

SUMMARY OF THE INVENTION

The method and apparatus for improved flow control of the present invention solves the aforementioned problems and meets the aforementioned needs by providing a servo-control circuit for use with a fluid flow metering valve having a solenoid controlled valve actuator. The valve actuator is formed of a magnetic material and the solenoid is adapted to create a magnetic field for continuously variably moving the valve actuator toward or away from an aperture through which fluid is confined to flow. An input position command signal representative of a desired position of the actuator is provided to the servo-control circuit for producing an associated output command for producing a magnetic field in the valve. The actuator responds to the magnetic field by changing its position and the magnetic permeability thereof modifies the applied magnetic field as a function of the position. A magnetic field sensor senses the magnetic field as it is modified by the actuator to determine the actual position of the actuator. The sensor produces an actual position signal representative of the actual position. The actual position signal is provided to the servo-control circuit as negative feed-back to the input position command signal, to produce an updated version of the output position command signal for controlling the position of the actuator and, hence, flow through the valve.

Accordingly, it is a principal object of the present invention to provide a novel method and apparatus for improved flow control.

It is another object of the present invention to provide such a method and apparatus that provides improved response in a flow control system.

It is still another object of the present invention to provide such a method and apparatus that provides improved stability in a flow control system.

It is yet another object of the present invention to provide such a method and apparatus that provides improved accuracy in controlling mass-flow.

It is a further object of the present invention to provide such a method and apparatus that provides improved repeatability in controlling mass-flow.

The foregoing and other objects, features and advantages of the invention will be more readily understood upon consideration of the following detailed description of the invention, taken in conjunction with the following drawings.

DETAILED DESCRIPTION OF A PREFERRED EMBODIMENT

Figure 1:
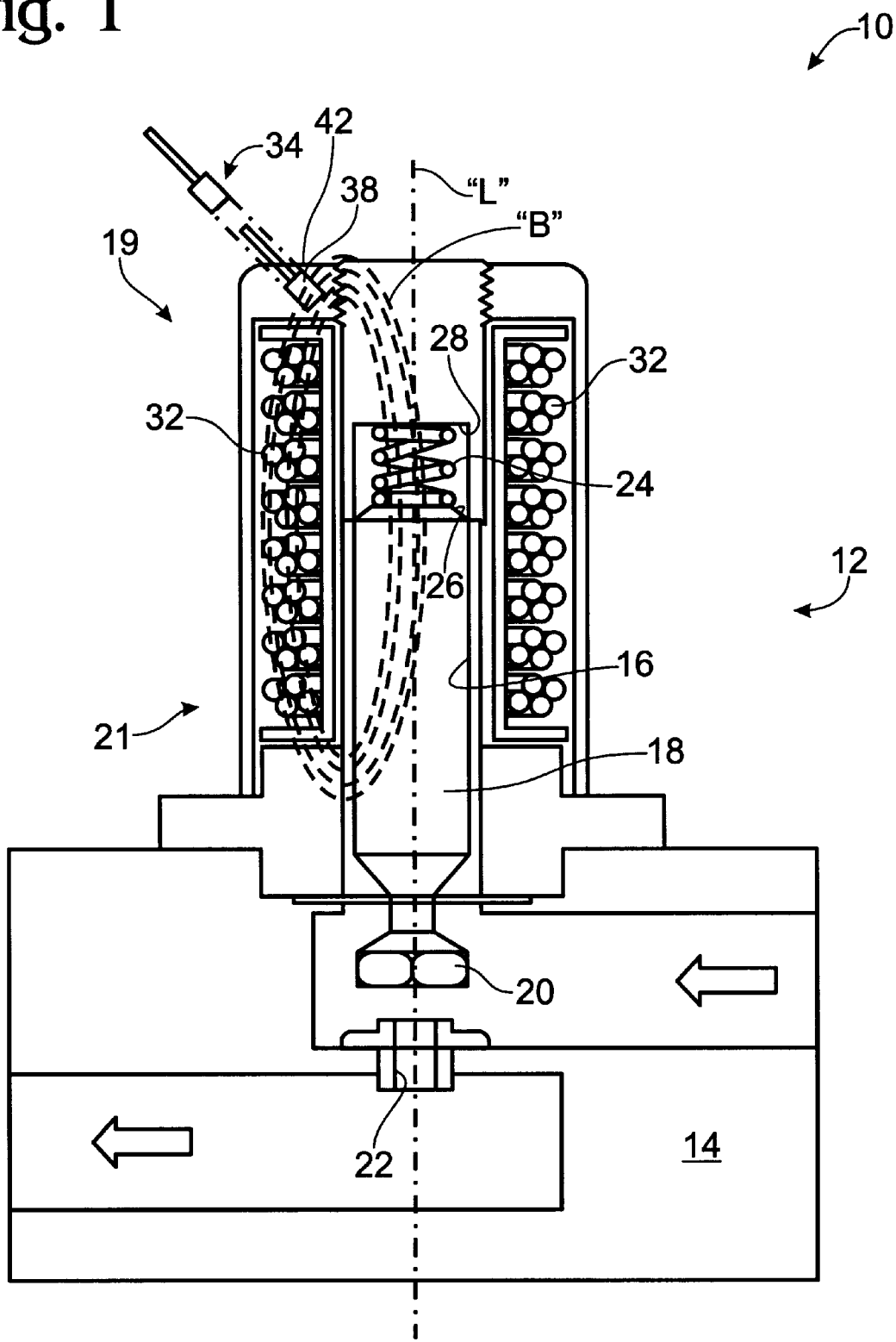
FIG. 1 is a sectional, side elevation of an apparatus for improved flow control according to the present invention.

Referring to FIG. 1, an apparatus 10 for improved flow control according to the present invention preferably employs a standard, prior art mass-flow metering valve 12. The valve 12 includes a valve body 14 containing a cylindrical bore 16 slidingly receiving a rod-like actuator 18 along a longitudinal axis "L". The actuator is adapted for linear translation in the direction of the axis "L" within the bore. The actuator includes a plunger 20 at an end thereof adapted to obstruct, to a varying degree as a function of the linear position of the actuator, an aperture 22 in the body 14 through which a fluid is confined by the body to flow. Flow through the aperture is controlled by the linear position of the plunger with respect to the aperture along the axis "L".

Figure 2:
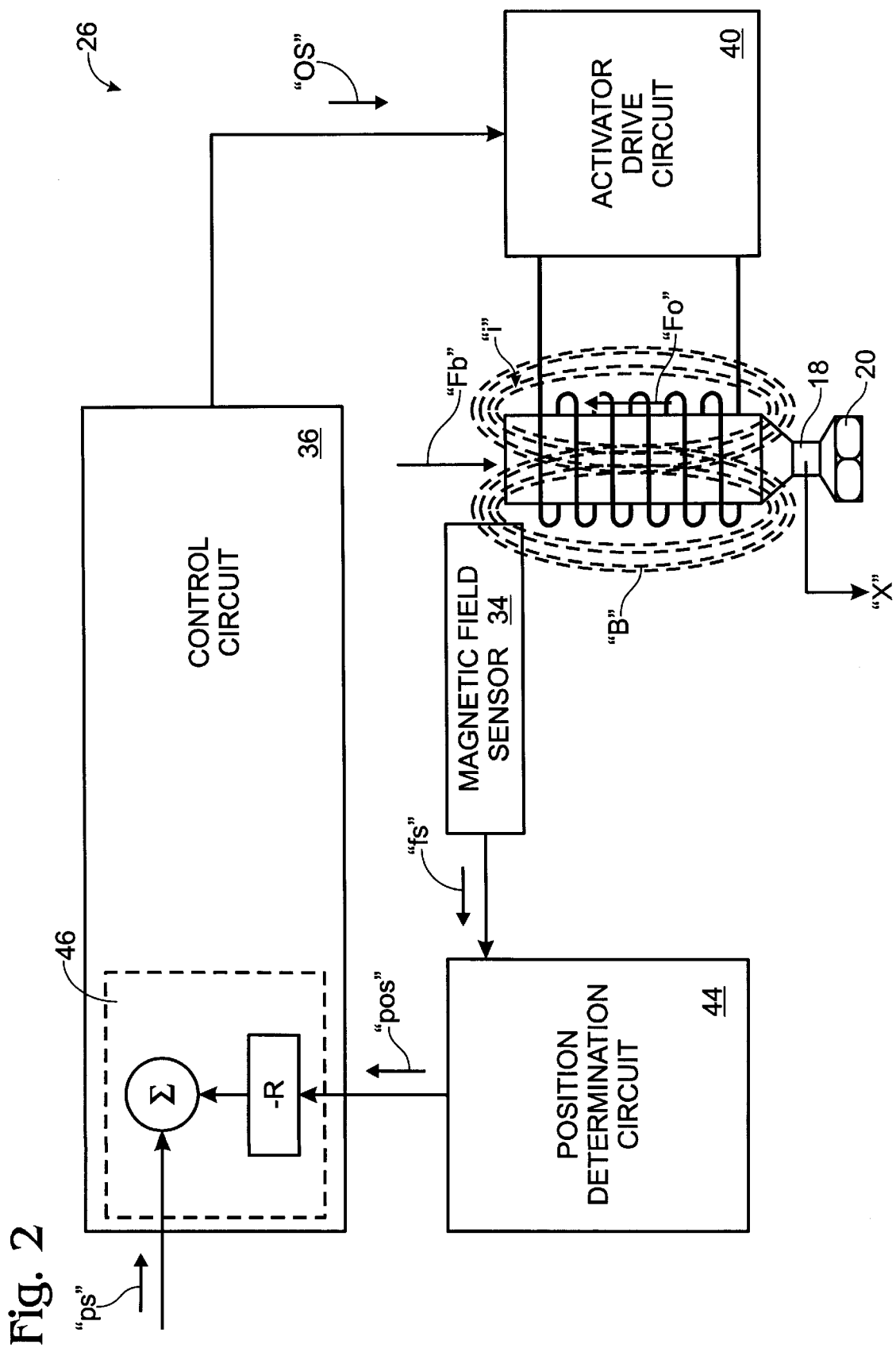
FIG. 2 is a block diagram of a servo-control system according to the present invention for controlling the apparatus of FIG. 1.

Referring in addition to FIG. 2, a biasing force "$F_b$" is provided to the actuator to bias the linear position of the actuator toward the aperture and, therefore, to decrease or shut-off flow through the valve in the absence of an opposing force. The biasing force is typically provided by a spring, such as the disc-like spring 24 depicted in FIG. 1, connected to the actuator 18 and resisted by a surface 28 of the valve body 14, The spring force generally increases with the distance that the actuator moves toward the surface 28 in substantially direct proportion:

$$F_b X,$$

where "x" is the position of the actuator.

To control flow through the valve, a selected opposition force "$F_o$" is applied to the actuator to oppose the biasing force and thereby move the actuator a selected amount against the biasing force. The biasing force is generally provided so that the opposition force must reach a threshold value before being sufficient to unseat the plunger from the aperture. Therefore, the actuator changes its linear position only after the threshold value is reached, so that:

$$F_o - F_{th} = \Delta F_o \Delta x,$$

where $F_{th}$ is the threshold value. While a typical metering valve and biasing scheme for use in the present invention has been described for illustrative purposes, other structures and biasing schemes may be employed.

The opposition force is provided to the actuator 18 by an applied magnetic field. The actuator is formed of a magnetically permeable material that responds to the applied magnetic field by aligning magnetic domains in the material with the field to an extent functionally related to the strength of the field. The material then "conducts" the magnetic field as the magnetic field "permeates" the material. As a result, the field is concentrated in the material and is diminished outside of it. In this way, the material "modifies" the applied field. The actuator moves in response to the force which arises to the extent the magnetic domains of the actuator are aligned by the field. The actuator is provided as having substantially no permanent magnetization and the applied fields are sufficiently small that no substantial permanent magnetization of the actuator is caused during operation of the valve. Actuator materials for such passive response to an applied magnetic field employed for actuation of the valve 12 are commonly available and actuators may be formed of such materials with relative ease and economy. For valves 12 employed in caustic environments such as in semiconductor device fabrication, the actuator may be formed of a magnetic stainless steel.

For applying the magnetic field to the actuator, the valve 12 includes a coil 32 of wire wrapped concentrically around the bore 16. A current "i" is passed through the coil to generate a magnetic field having a magnetic field strength "H" (not shown), oriented along the axis "L", which is proportional thereto:

$$H\,i.$$

The poles of the field are associated respectively with a distal end 19 of the coil and a proximal end 21 of the coil, depending on the direction of current flow therethrough. The (magnetomotive) opposition force is proportional to "H", so that $$\Delta x \, \Delta i.$$

However, measuring changes in the current "i" will not provide a very good determination of the force that is actually felt by the actuator, which is necessary for controlling the position thereof. As has been explained, the field "permeates" the actuator. Where the material is a ferromagnetic material such as iron and steel, a magnetic flux density "B" in the material is related to the applied field strength "H"as:

$$B = \mu \cdot H,$$

where $\mu$ is the magnetic permeability of the material.

The measurable field "B" outside of the material is determined in consideration that H is applied in parallel across an air gap having a relatively small permeability and a ferromagnetic material having a relatively large permeability that varies as a function of the position of the actuator. It can be seen, then, that the resulting magnetic field "B" outside of the material will vary sensitively with variations in the position of the actuator resulting from changes in the current Moreover, the actuator is a real mechanical device and responds predictably to a given applied field only within limits. Thence, there is in addition a tolerance error associated with attempts to set the position of the actuator solely by controlling the current through the coil.

For all of these reasons, controlling the valve setting by controlling the current "i" is problematic. The present invention, however, takes advantage of the fact that the actuator modifies the applied magnetic field in responding thereto and recognizes that this accounts for the tolerance error as well.

Motivated by this insight, the apparatus 10 provides, in combination with a flow metering valve such as the aforedescribed valve 12, a servo-control system 26 including a magnetic field sensor 34 and a control circuit 36. Because the actuator modifies the magnetic field in responding thereto, there is no need to provide a permanent magnet attached to the actuator such as taught by Gottling to signal the position thereof Further, sensing the resulting field "B" over a range of the input current "i" provides for continuous determination of the position of the actuator over the range of positions.

Referring particularly to FIG. 2, a position command signal "ps" representative of a desired position of the actuator is provided to the control circuit 36. The control circuit produces an output command signal "os" to an actuator drive circuit 40. Preferably, the actuator drive circuit produces the current "i" in response to the signal "os"; however, the control circuit may produce the current "i" and provide the current directly to the coil. The actuator 18 moves as a result of changes in the current "i" and, therefore, the magnetic field "H" as explained above.

Referring back to FIG. 1, the magnetic field sensor 34 is disposed proximate the coil 32, preferably in a pocket 38 provided in valve body cover 42 of the valve body 14 so as to dispose the field sensor adjacent the distal end 19 of the coil, where the magnetic field is relatively strong. The sensor 34 is disposed at an orientation in relation to the field "B" so as to maximize its sensitivity to the field and therefore will generally vary according to the location of the sensor with respect to a given range of the field. The pocket 38 is preferably machined, such as by electric-discharge, into a solid portion of the valve body cover, so that it is embedded therein. As the valve body cover is typically also formed of a ferromagnetic material, such as steel, embedding the sensor 34 therein may improve sensitivity by placing the sensor in the path of greater flux density.

Turning back to FIG. 2, the magnetic field sensor 34 senses the magnetic field "B" that results from the applied field "H" and its interaction with the permeability of the actuator at the resulting position of the actuator. The magnetic field sensor then produces a field strength signal "fs" representative of the strength of the magnetic field "B" and provides the field strength signal to a position determination circuit 44. The position sense circuit responds to the field strength signal by producing an actual position signal "pos" correlated thereto. The actual position signal "pos" is relatable to the actual position of the actuator 18 in a manner described below. Alternatively, the magnetic field sensor 34 may be adapted to produce the actual position signal directly.

The actual position signal "pos" and the position command signal "ps" are combined in a feed-back portion 46 of the control circuit 36. The feed-back portion receives the actual position signal and multiplies it by a negative gain "−k", and forms a sum of the resulting signal and the actual position signal. The control circuit compares the actual position signal "pos" with the position command signal "ps" and updates the output command signal "os" by reducing the output command signal, if the actual position signal "pos" is greater than the previous value of the output command signal, or increasing the output command signal, if the actual position signal is less than the previous value of the output command signal. The amount of negative feed-back is variable as is well known in the art and is selected as a trade-off between response time and stability.

It is particularly advantageous to employ a Hall effect sensor in the magnetic field sensor 34, as this solid-state device provides a highly accurate and relatively immediate output that has a simple electrical relationship to magnetic field intensity. However, any sensor adapted to measure the resulting magnetic field "B" over a substantially continuous range thereof may be employed without departing from the principles of the invention.

The control circuit 36 preferably employs a microprocessor to compute the updated output command signal from the position command signal and the actual position signal. However, servo-control may be accomplished as well with analog devices or discrete digital devices, and may be accomplished in any manner known in the art without departing from the principles of the invention.

By providing a servo-control system 26 for use with the valve 12, the apparatus 10 more accurately and responsively sets the position of the actuator 18 as desired. Greater responsiveness and stability of a larger control system for controlling the valve is also provided, because the valve with servo-control acts like a valve that is more responsive, accurate, repeatable and stable than the same valve without the servo-control. This is an advantage in any control system. However, a particular, additional advantage accrues when employing the valve 12 to control mass-flow. The metering valve is typically installed in a piping system adapted for delivering the fluid to a target destination downstream. A mass-flow measuring device is employed with a mass-flow control system for controlling the valve. The mass-flow measuring device must generally be positioned some distance away from the target. Thence, there is a transit time during which material flows between the valve and the measuring device. The transit time represents an additional timing error in controlling the mass-flow that is proportional to the transit time and the rate of change of the mass-flow. The timing error further aggravates the capability for the control system to responsively, accurately, repeatably and stably control mass-flow and may compound with the tolerance error. Accordingly, the servo-control system 26, in conjunction with the mass-flow control system, provides for a further enhanced flow control.

As mentioned above, the position sense circuit 44 responds to the field strength signal "fs" by producing an actual position signal "pos" correlated thereto. The actual position signal is representative of the actual position of the actuator 18. The relationship between the measured field strength and the actual position of the actuator is preferably determined by calibration. In calibration, the actual position of the actuator is independently measured in response to a plurality of values of measured field "B", to produce a mapping of the actual position as a function of the "B". The position of the actuator may be actually measured or determined by any means known in the art, such as by being inferred from a measured mass-flow which is passed by the valve and which has reached a steady-state value in response to a change in the field "B". Such calibration is most easily accomplished during manufacture of the device, wherein a set of calibrations are provided in ROM in the servo-control circuit 32. However, calibrating the apparatus after it has been installed in a piping system by storing the calibrations in programmable memory such as RAM provides the advantage of accommodating for particular environmental and flow parameters. In either case, to best eliminate the tolerance error, calibration should be performed on each copy of the apparatus 10.

It is to be recognized that, while a specific method and apparatus for improved flow control has been shown as preferred, other configurations and methods could be utilized, in addition to configurations and methods already mentioned, without departing from the principles of the invention.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims that follow.

We claim:

1. An apparatus for controlling fluid flow, comprising:
   a magnetic field producing device adapted for receiving an output position command signal and producing a first magnetic field in response thereto;
   a flow controlling device including a valve body and a movable actuator adapted for controlling flow through said valve body as a function of the position of said actuator relative thereto, said actuator being adapted to change position in response to changes in said first magnetic field, said actuator modifying said first magnetic field to form a resulting magnetic field which is a function of the position of said actuator; and an actuator position sensing device adapted and disposed with respect to said valve for sensing said resulting magnetic field and producing an actual position signal responsive to said resulting magnetic field and representative of the actual position of said actuator, for controlling said magnetic field producing device.

2. The apparatus of claim 1, further comprising a control circuit coupled to said actuator position sensing device and said magnetic field producing device and adapted for producing said output position command signal in response to said actual position signal, for controlling the position of said actuator.

3. The apparatus of claim 2, wherein said control circuit is adapted to receive an input position command signal representative of a desired position of said actuator and to produce said output position command signal in response thereto, wherein said actual position signal is negatively fed back to said input position command signal, for controlling the position of said actuator to substantially equal said desired position.

4. The apparatus of claim 1, wherein said magnetic field producing device comprises a conductive coil coaxially disposed about said actuator, and said command signal produces a current provided to flow through said coil and thereby generate said applied magnetic field.

5. The apparatus of claim 4, wherein said actuator consists essentially of a ferromagnetic material having substantially no permanent magnetization.

6. The apparatus of claim 1, wherein said actuator position sensing device includes a Hall effect device for sensing said resulting magnetic field.

7. The apparatus of claim 6, wherein said Hall effect device is embedded in said valve body.

8. The apparatus of claim 7, wherein said valve body is formed substantially of a ferromagnetic material.

9. The apparatus of claim 1, wherein said cover includes a material that has a substantially higher magnetic permeability than air, and wherein said actuator position sensing device is incorporated into said cover.

10. The apparatus of claim 9, wherein said actuator position sensing device is incorporated into said cover by being disposed in an aperture therein.

11. A method for metering fluid flow through a valve having an actuator adapted for controlling, in accordance with the position of the actuator, flow through the valve, comprising:

receiving an output position command signal representative of a desired position of the actuator within a range of available positions of the actuator;

applying a magnetic field responsive to said output position command signal;

moving the actuator in relation to said magnetic field;

modifying said magnetic field as a function of the position of the actuator;

sensing the modified magnetic field;

producing an actual position signal responsive to the sensed magnetic field and representative of the actual position of the actuator; and producing said output position command signal in response to said actual position signal, for controlling the position of the actuator within said range.

12. The method of claim 11, fuirther comprising providing an input position command signal representative of a desired position of said actuator, negatively feeding back said actual position signal to said input position command signal, and producing said output position command signal in response thereto, for controlling the position of said actuator to substantially equal said desired position.

13. The method of claim 12, further comprising providing a conductive coil, wherein said step of receiving said command signal includes receiving a current and transmitting said current through said coil to produce said magnetic field.

14. The method of claim 13, wherein said step of passively modifying said magnetic field is by providing said actuator to consist essentially of a magnetically permeable having substantially no permanent magnetization.

15. The method of claim 11, further comprising providing an input command signal representative of a desired magnitude of a flow-related characteristic, sensing the magnitude of said flow-related characteristic, producing an actual magnitude signal representative of an actual magnitude of said flow-related characteristic, negatively feeding back said actual magnitude signal to said input command signal so as to produce said input position command signal, for controlling the magnitude of said flow-related characteristic to substantially equal said desired magnitude.

16. The method of claim 15, wherein said flow-related characteristic is the magnitude of a mass-flow, and wherein the method is employed for minimizing the effect of timing error due to the transit time of said mass-flow between a measuring device adapted for measuring said mass-flow and a targeted location at which it is desired to control said mass-flow.

* * * * *

UNITED STATES PATENT AND TRADEMARK OFFICE
CERTIFICATE OF CORRECTION

PATENT NO. : 6,002,337
DATED : December 14, 1999
INVENTOR(S) : Paul B. Palfey et al.

It is certified that error appears in the above-identified patent and that said Letters Patent is hereby corrected as shown below:

Column 7,
Line 8, delete "valve for sensing said resulting magnetic field" and replace with
-- valve body for sensing said modified magnetic field --.

Column 8,
Line 32, delete "permeable" and replace with -- permeable material --.

Signed and Sealed this

Ninth Day of August, 2005

JON W. DUDAS
*Director of the United States Patent and Trademark Office*